Patented June 9, 1931

1,809,437

UNITED STATES PATENT OFFICE

CHARLES W. CARMAN, OF WASHINGTON, PENNSYLVANIA, ASSIGNOR, BY MESNE ASSIGNMENTS, TO STAINLESS STEEL CORPORATION, OF YOUNGSTOWN, OHIO, A CORPORATION OF DELAWARE

STAINLESS CHROMIUM ALLOY AND METHOD OF PRODUCING SAME

No Drawing. Application filed September 15, 1927. Serial No. 219,825.

This invention relates to stainless steels and has for its object to cheapen the production of such materials and also to provide a steel of superior stainless characteristics combined with good mechanical strength at less cost and using a smaller percentage of chromium in the steel than has heretofore been possible to obtain these results. Other objects include reduction in chromium oxidation losses, reduction in time required for purification of the bath, reduction in carbon content of the final alloy without excessive cost, and elimination of the necessity for heat treatment and rolling in order to obtain the stainless character in the alloy in the billet.

The 12 to 16% chromium stainless steels are expensive, because of the large amount of ferro-chromium used in their production, the time taken for purification of the bath, the chromium oxidation losses and because they must be heat treated and substantially reduced in size before possessing their stainless character. There are also steels containing over 18% tungsten or cobalt which are substantially stainless, but are not capable of wide use because of their high cost and high carbon content.

According to this invention scrap is melted down in an electric furnace, impurities slagged off, ferro-chromium added, gaseous oxygen injected to reduce the carbon content and rapidly oxidize impurities whereby less chromium oxidation losses are present. After allowing the bath to come to equilibrium and skimming the slag, gaseous oxygen is again injected for further purification. The amount of ferro-chromium added is sufficient to give the desired strength and elastic limit to the metal. This ferro-chromium is believed to absorb a portion of some of the gases usually occluded in the steel, but not all of them.

This invention is conducted in a commercial electric furnace having its side wall perforated to receive an oxygen supply pipe extending down into the bath to adjacent the bottom and center of the container, the pipe being made of some material having a high melting point, such as a chromium nickel base alloy. This pipe is preferably adjustable so that it may be withdrawn from the bath when not in use. The standard oxygen bottle is a convenient source of supply to the pipe and a flexible hose connects the pipe and bottle, the usual reducing or control valve being provided to regulate the quantity of oxygen supply. A basic bottom is preferably burned into the furnace in the usual manner. A thin bed of crushed lime stone about nut size is spread over the bottom of the furnace and on top of this lime stone bed is charged a good grade of low carbon scrap that is not too rusty thereby reducing excessive oxidation losses.

In operation the current is turned on and the scrap, preferably a low carbon open hearth or Bessemer steel, melted down. When melted the bath will have a temperature of about 2780 degrees F. As soon as melted a mixture of lime stone and silica sand is added as a flux, there being preferably about four parts of limestone to one part of silica sand and about 120 pounds of the mixture per ton of steel scrap charged. After the slag is formed the furnace is tilted to run it off. Usually the first addition of flux accomplishes the desired result, in removal of sulphur and phosphorous, but if not another dosage of flux of the same type as the first may be added to slag off the desired impurities and make the bath lower in these impurities than is desired in the final product. The next step is the addition of ferro-chromium preferably of the cheaper grade containing a high percentage of carbon as this is less expensive than the ferro-chromium containing a low percentage of carbon. While the limestone is added for the purpose of reducing the sulphur and phosphorous content, nevertheless it also reduces the amount of silicon and manganese in the bath, so that at the time of adding the ferro-chromium it is also necessary to add ferro-manganese and ferro-silicon in the desired amounts. Before addition of these materials to the bath and after the first slagging off, the bath is merely a low carbon steel unsuitable for any commercial purpose because wild and gaseous. Its analysis at this time will be substantially as follows:

| | |
|---|---|
| Carbon | under .15% |
| Phosphorous | under .05% |
| Sulphur | under .05% |
| Silicon | under .05% |
| Manganese | under .20% |

Before adding any of the fluxes and alloying materials, the current is preferably shut off to avoid the formation of a short circuit within the furnace. A second flux of limestone mixed with coal tar is then added. The coal tar aids in solidifying and forming a plastic slag. Immediately thereafter oxygen is supplied through the pipe into the bath under a pressure of about 2 pounds to the square inch, or just enough to overcome the head on the molten metal. The purpose of this oxygen injection is to produce a mild ebullition, to lower the carbon content of the bath, oxidize off the impurities and raise the temperature. For this purpose the oxygen supply pipe need not extend all the way to the bottom of the bath, so that with less head of metal less gas pressure is needed and less oxygen consumed. About 12 cubic feet of oxygen per ton of metal in the furnace is injected over a period of about 20 minutes. When the supply of oxygen is cut off the bath is let stand for about ten minutes in order to reach equilibrium, after which the slag is removed and spoon tests made which are analyzed in order to determine the final analysis. These tests take about fifteen minutes. During injection of oxygen, it is desirable to have a fairly plastic slag covering the bath in order to reduce the carbon content, as otherwise carbon would be re-absorbed and the content not lowered to the same extent. When the steel is thoroughly killed sample tests are taken for analysis. If the results show the composition of the bath to be higher or lower than desired, the elements needing change are lowered or raised by the usual method followed in steel making. The nickel or other alloying materials are preferably added after the first injection of oxygen and after the second slagging off. Oxygen is again supplied to the bath for about half the duration of the first injection. The purpose of the second injection of oxygen is to cause a further purification and a more active ebullition of the bath. For this second injection about 38 to 45 cubic feet of oxygen per ton of metal is used at a much higher pressure, say about 35 to 45 pounds per square inch, and preferably with the supply pipe reaching to the bottom and central portion of the furnace. During the second injection of oxygen a material containing about four pounds of metallic aluminum and three tenths of an ounce of palladium oxide per ton of steel is added in powdered or granular form about the size of shot. This mixture of palladium oxide and aluminum is floatable at least temporarily on the bath. The aluminum serves to temporarily float the palladium oxide and later is substantially all fused off so that the final product contains only a trace of aluminum. It is desirable to add the palladium oxide and aluminum while the bath is agitated by the oxygen as best results appear to be obtained in that way. On shutting off the second supply of oxygen the bath temperature is probably about 3100 degrees F. from which temperature it is allowed to cool until at the best pouring temperature. The bath is now at a temperature of about 2810 degrees F. and is ready for pouring into molds or ingots. Preferably the molds are removed and material reheated to about 1650 degrees F. for rolling or blooming into a variety of forms, such as, structural shapes, plates, bars and the like. The material of this invention is substantially homogeneous free from the usual occluded gases and therefore ingotism losses are reduced from about the usual 17 to 20% to as low as 4% and generally lower. The typical analysis of a stainless steel made by this process is as follows:

| | |
|---|---|
| Carbon | under .15% |
| Manganese | under .4% and above .35% |
| Phosphorus | under .03% |
| Sulphur | under .03% |
| Silicon | from .1 to .3% |
| Chromium | from 4.5 to 7.5% |
| Nickel | under 1.5% |
| Copper | only a trace |
| Aluminum | only a trace |
| Palladium | only a trace |
| No more than a trace of hydrogen, nitrogen and oxygen. | |
| Balance iron. | |

The physical properties of this alloy include:—

| | |
|---|---|
| Melting point | 2750 degrees F. (1520 degrees C.) |
| Weight (rolled) | .276 pounds per cubic inch, 477 pounds per cubic foot. |
| Specific gravity (rolled) | 7.67 |
| Coefficient of linear expansion | .0000108 per degree C. from 0 to 500° C. |
| Thermal conductivity | .045 C.G.S. units about ⅓ times that of pure iron. |
| Scaling point | Maximum temperature for continuous service 1600° F. |
| Specific heat | .117 |
| Electrical resistivity | 60 to 65 microhms per c. c. at 200° C. |
| | 75 microhms per c. c. at 500° C. |
| | 80 to 85 microhms per c. c. at 1000° C. |

*Round bar—Room temperatures*

| | Hot rolled | Annealed ** | Cold drawn | Cold drawn and annealed |
|---|---|---|---|---|
| Ultimate strength* (lbs. per sq. in.) | 90–100,000 | 75–80,000 | 90–95,000 | 70–75,000 lb. |
| Yield point (lbs. per sq. in.) | 65–75,000 | 55–60,000 | 85–90,000 | 45–55,000 lb. |
| Elongation in 2" | 30–35% | 25–30% | 12–15% | 30–35% |
| Reduction of area | 55–65% | 65–75% | 60–65% | 70–75% |
| Brinell | 155–165 | 145–155 | 195–200 | 135–145 |
| Rockwell "B" | 90–94 | 86–90 | 96–100 | 82–86 |
| Izod | | 25–35 | | 60–70 |

* Data from ¾" round bar, cold drawn to ⅝" round.
** Annealed at 1450° F.

(Room temperature)—Sheet—14 U. S. gage

|  | Hot rolled | Box annealed * |
|---|---|---|
| Ultimate strength (lbs. per sq. in.) | 85–95,000 | 70–75,000 |
| Yield point (lbs. per sq. in.) | 65–80,000 | 45–50,000 |
| Elongation in 8" | 9–11% | 19–22% |
| Rockwell "B" scale | 80–95 | 60–75 |

* 1550° F.—8 hours at heat—cooled in box.

Higher temperatures than 1650 degrees F. may be used where the service is intermittent without this alloy scaling or oxidizing.

The following limiting static stresses may be maintained without deformation, but generally the safe working stress is considered as half the values given:

900° F _____ 25,000 lbs. per sq. in.
1000° F _____ 18,000 lbs. per sq. in.
1100° F _____ 7,000 lbs. per sq. in.
1200° F _____ 4,000 lbs. per sq. in.
1300° F _____ 3,000 lbs. per sq. in.

The stainless character of this alloy is found from the fact that the following materials do not attack the metal:
Ammonium chloride
Benzaldehyde
Benzene
Benzol
Carbon bisulphide
Chlorbenzol
Copal varnish
Mine waters
Mixed acid
Orthonitrochlorobenzene
Molten rosin
Sugar juice or syrup
Molten sulphur
Molten lead and tin, etc.
Hydrogen sulphide
Sulphur dioxide
Nitric acid in all concentrations
Acetic acid in the cold
Solutions of caustic alkalies
Ammonia in any strength of solution, likewise in gaseous form either wet or dry
A salt brine when the articles are completely submerged, or alternately wet or dry
Vegetable or fruit juices, such as orange, lemon, pineapple, tomato, onion, etc.
There is no contamination of milk either sweet or sour.

The materials which do attack this stainless alloy are:
Hydrochloric acid
Sulphuric acid
Acetic anhydride
Aniline hydrochloride
Antimony trichloride
Bromine and compounds
Chloracetic acid
Chlorine gas either wet or dry
Formic acid
Iodine and compounds
Hypo solution
Oxalic acid
Chloric and perchloric acids
Sulphur chloride
Molten zinc In making the foregoing tests the contact with the various salts specified extended over a period of about a week while only about twenty-four hours was necessary to obtain the desired information regarding the acids.

Seamless drawn tubing of this alloy can be produced in commercial sizes from ¼ inch OD by 18 inch gauge to 5½ inches OD by ⅜ inch wall, also standard iron pipe size up to 5 inches. Welded tubing and pipe can be made in all sizes up to 15 inches in diameter. Unlike the 12 to 16% chromium stainless steels no heat treating or rolling is necessary to produce the stainless characteristics in the metal as it is stainless in the billet. This material is more ductile and better adapted for deep drawing operations than the 12 to 16% chromium stainless steels as the following Erichsen tests will show on No. 17 gauge sheets, box annealed from a temperature of 1325° F. by allowing to cool to atmosphere in the box during an eight hour cycle before removing. Each of the following materials of the same size and subjected to the same heat treatment showed the following results from the standard Erichsen test:

```
                                                    m/m.
Ordinary low carbon open hearth steel_____ 10.4
7½% chromium steel of this invention_____ 10.2
12½ to 16% chromium steel (.2% carbon) _____  9.1
12½ to 16% chromium steel (.9% carbon) _____  7.8
```

Among the advantages of this invention may be included the high strength and low cost of this alloy which possesses stainless properties substantially the equivalent of the more expensive 12 to 16% chromium stainless steels. The addition of chromium and nickel to this alloy imparts the mechanical strength substantially equal to that of the 12 to 16% chromium stainless steels. The removal of occluded gases is an important factor making the homogeneity, low piping losses and apparently enhancing the stainless properties of the alloy. The absence of occluded hydrogen from the metal is regarded as particularly important. In a sample of 12.5 to 15.5% chromium stainless steel containing about .2% carbon it was found that the occluded gases had not been removed to the same extent they are removed in the alloy of this invention, and while no more than a trace of hydrogen was found, yet .024% oxygen, .021% nitrogen, and .034% carbon monoxide were discovered. In the analysis given above for an alloy of this invention the term "trace" signifies, as it does in general practice, the presence of not more than .0005%. The use of oxygen gas is quicker and more effective in purifying the bath and also eliminates the presence of nitrogen compounds in the bath as would not be the case if air were used. It is believed that the ferro-chromium has an affinity for some of the usual occluded gases, such as, hydrogen, nitrogen and oxygen, so that the amount of palladium necessary is not as great as would be the case if no ferro-chromium were used. Ingotism and piping losses are reduced by this invention from the usual seventeen to twenty percent (17 to 20%) to four percent (4%) and below due to the homogeneous character of the metal and its freedom from occluded gases. While possessing substantially the same strength as the 12 to 16% stainless steels, the stainless alloy of this invention is produced at a lower cost for a number of reasons. It is not necessary to subject this material to any heat treatment or rolling in order to provide its stainless character inasmuch as it is stainless in the billet. Under the usual practice for making the ordinary stainless steels a far greater time is consumed in refining operations with the result that chromium oxidation losses are generally about 15 to 30%, while under this invention due to the speedy oxidation of impurities by means of gaseous oxygen injected, chromium oxidation losses are greatly reduced to generally 3½% to 4%, although sometimes as low as 1%. Another advantage of this invention is the provision of a low carbon stainless steel without the cost that it was previously thought necessary, or in fact without even the cost that it was heretofore necessary to make the ordinary 12 to 16% stainless steel of the .9% carbon or thereabouts. Due to the injected oxygen reducing the carbon content, one is enabled to use a cheaper and lower grade ferrochromium.

The term "scrap" includes steel scrap as well as scrap pig iron. Instead of feeding the furnace with this scrap and adding fluxes to slag off impurities, the process could be conducted as a duplex method by first purifying, for example, in an open hearth or Bessemer converter and then allowing the molten metal to run directly into the electric furnace for further and final purification.

By the term "stainless steel" is meant a steel having characteristics at least substantially the same as those of the 12 to 16% chromium stainless steels in respect to their freedom from attack by fruit juices and the other reagents mentioned above. The 12 to 16% chromium stainless steels are effected in the same way by the reagents mentioned above.

I claim:

1. The method of purifying a bath of molten metal which comprises slagging off impurities, adding ferrochromium, injecting oxygen into the bath and adding a flotable material comprising a metallic oxide and a reducing agent that fuses off during the oxygen injection.

2. The method of purifying a bath of molten steel which comprises slagging off impurities, adding ferrochromium, injecting oxygen into the bath, again slagging off impurities, again injecting oxygen into the bath, and then adding a flotable material comprising a metallic oxide and a reducing agent that fuses off during the oxygen injection.

3. The method of treating a bath of molten metal which comprises adding ferrochromium and then injecting gaseous oxygen to lower the carbon content of the bath and hasten the removal of impurities while having a plastic slag over the bath, removing the slag, agitating the bath and adding a material comprising a metallic oxide and a metallic reducing agent that fuses off.

4. The method of treating a bath of molten metal which comprises agitating the bath accompanied simultaneously with the oxidation of impurities, and adding during agitation of the bath a floatable material comprising a finely divided metallic oxide and a finely divided reducing agent that fuses off.

5. The process of treating a molten bath in the production of steel which comprises injecting oxygen and adding during ebullition a floatable mixture comprising a finely divided oxide and a finely divided reducing agent.

6. The process of treating a molten bath in the production of steel which comprises injecting oxygen and during the injection of oxygen adding a floatable mixture comprising an oxide of a member of the platinum group with a reducing agent.

In testimony whereof I have hereunto set my hand this 2nd day of September 1927.

CHARLES W. CARMAN.